United States Patent Office 3,038,691
Patented June 12, 1962

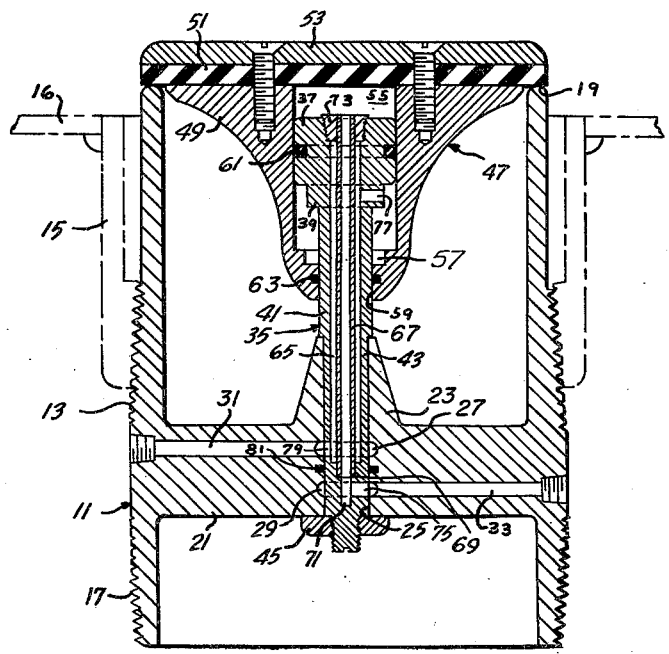

3,038,691
AIR OPERATED WATER VALVE FOR CONCRETE MIXING PLANT OR THE LIKE
John B. Awerkamp, % Awerkamp Machine Company, 237 N. 7th St., Quincy, Ill.
Filed Apr. 4, 1960, Ser. No. 19,540
2 Claims. (Cl. 251—31)

This invention relates to a fluid operated valve, and more particularly to an air operated dump valve for use in a water measuring system of a concrete mixing plant.

In the make up of concrete, accurately measured quantities of all ingredients are required. In an operation of this type, water may be supplied to a measuring device such as a scale mounted container. It is desirable to provide a water control valve which is positive acting and which will respond immediately to a control mechanism which may be incorporated with the above mentioned scale.

An object of this invention is to provide an improved water valve which is fast acting and positive acting in both the opening and closing cycles.

Another object of this invention is to provide an improved fluid operated valve in which the operating mechanism is entirely self-contained and sealed from the material which flows through the valve.

A further object of this invention is to provide an improved fluid operated valve which is self-contained and which is characterized by simplicity of structure and ease of maintenance.

A still further object of this invention is to provide an improved fluid operated valve which is particularly adapted to be controlled remotely.

A valve embodying the present invention includes an elongated hollow housing, one end of which defines a valve seat. A piston member, comprising a piston and stem, is securely mounted in an internal web in the valve housing. A valve closure member includes a flange portion for seating on the valve seat and a cylinder chamber for receiving the piston; the valve closure member being entirely supported by the piston member for relative longitudinal movement. Passages in the piston member and web communicate the cylinder chamber, on both sides of the piston, with the exterior of the housing. Conduits for remote control operation of the valve may be fitted to the housing at the exterior openings of these passages.

The novel features of the invention, as well as additional objects and advantages thereof, will be understood more fully from the following description when read in connection with the accompanying drawing in which:

FIGURE 1 is an end view of a valve embodying the present invention; and

FIGURE 2 is a sectional view taken along the line 2—2 of FIGURE 1, viewed in the direction of the arrows.

Referring now in detail to the accompanying drawing, an illustrative embodiment of the invention is shown and will be described. In the following description, and in the claims, the references to the upper and lower ends of the several elements are merely for identification with respect to FIGURE 2 of the accompanying drawing. It will be apparent that the valve will operate inverted from the illustrated position, or in any other position. The valve is preferably controlled by air; however, other fluids may be used.

The illustrated valve comprises a cylindrical housing 11, which is somewhat in the form of a standard pipe nipple, including threads 13 for threaded engagement with a pipe coupling 15, for example, and threads 17 to which a threaded conduit may be attached. The pipe coupling 15 may be welded in an opening in a tank bottom 16, for example. The upper end of the housing defines an annular valve seat 19. The housing is provided with an internal, integral web 21 which includes an upwardly extending boss 23. A central longitudinal bore 25 extends through the web and boss and includes axially spaced annular grooves 27 and 29. Transverse passages 31 and 33 in the web connect, respectively, the annular grooves 27 and 29 with the exterior of the housing. At the exterior ends of these passages, the housing is tapped to receiving couplings for air hoses or other conduits for controlling the valve, as will be described.

A piston member 35 includes a piston 37 at its upper end, an adjacent dashpot piston 39 of reduced diameter, an intermediate stem portion 41, and a reduced diameter stem portion 43 threaded at its lower end. The stem portion 43 is received in the web bore 25, with a press fit, and is positioned within the web by a shoulder, defined by the stem portions 41 and 43, engaging the top of the boss 23. A nut 45 secures the piston member in the web.

A valve closure member 47 consists of an inverted bell-shaped body 49, a rubber disc washer 51, and a disc cap 53. The cap is secured to the body 49 by means of screws and the washer 51 is confined between the body and the cap. The cap and washer are of sufficient diameter to oppose and to engage the valve seat 19, while the body 49 is dimensioned to be received within the housing. The valve body 49 is provided with a stepped bore including an upper cylinder chamber 55, an adjacent dashpot chamber 57, and an opening 59 for the piston stem portion 41.

The valve closure member 47 is entirely supported by the piston member 35 for longitudinal rectilinear movement with respect to the piston member. An O-ring 61 is mounted in an annular groove in the piston 37 to seal the piston with respect to the wall of the chamber 55. An O-ring 63 is provided in an annular groove in the valve body opening 59 to seal the valve body with respect to the piston stem portion 41. The disc washer 51 seals the upper end of the cylinder chamber 55 so that this chamber is completely enclosed when the valve is assembled.

The piston member 35 is provided with a longitudinal bore 65 which extends from the upper face of the piston to a point adjacent the lower end of the member. The lower end of the bore is stepped to receive a tube 67, in a press fit, at an intermediate reduced diameter portion 69, and to provide a further reduced diameter portion 71 to communicate with the tube 67. At the upper face of the piston 37, a bushing plug 73 seals the upper end of the bore 65 and supports the tube 67 and its upper end; while permitting communication of the tube with the chamber 55 above the piston 37. A transverse passage 75, in the stem portion 43, communicates the bore 71 and the tube 67 with the annular groove 29 and the passage 33 in the web, thereby communicating the chamber 55 above the piston 37 with the exterior of the housing 11. A transverse passage 77, in the dashpot piston 39, communicates the bore 65 with the chamber 55 below the piston 37. A transverse passage 79, in the stem portion 43, communicates the lower end of the bore 65 with the annular groove 27 and passage 31 in the web, thereby communicating the chamber 55 below the piston 37 with the exterior of the housing 11.

The annular grooves 27 and 29 are provided so that the piston member 35 need not be angularly oriented with respect to the web 21. An O-ring 81 is provided in an annular groove in the web, intermediate the annular grooves 27 and 29, to prevent leakage of air between the last mentioned annular grooves.

The operation of the valve will be apparent from the foregoing description. Conduits connected to the web passages 31 and 33, at the exterior of the housing, may be connected to an air supply controlled in any desired manner, through a conventional 4-way valve, for example. The present valve is shown in the closed position, and is held in the closed position by air directed to the chamber 55 below the piston through passages 31 and 79, bore 65, and passages 77. In this condition, the chamber 55 above the piston is open to atmosphere.

When it is desired to open the valve, the control valve may be reversed to direct air to the chamber 55 above the piston through passages 33 and 75, bore 71, and tube 67 to raise the valve closure member 47. In this condition, the chamber 55 below the piston is open to atmosphere. Since the valve movement under air control is very fast, a dashpot damper is provided which consists of the dashpot chamber 57 in the valve body and the dashpot piston 39 on the piston member. The piston 39 is dimensioned to fit relatively loosely within the chamber 57 to permit air leakage. The passage 77 in the dashpot piston should be positioned so that it will not be completely closed when the dashpot piston is fully received in the chamber 57. The dashpot damper provides an air cushion to prevent damage to the parts when the valve is opened. When the valve is closed, the disc washer 51 absorbs the impact force.

The simplicity and rugged structure of the above described valve are apparent. The number of parts is small. The piston member is securely mounted in the web, yet it is easily removable for maintenance. Likewise, the valve closure member is securely mounted for movement with respect to the piston and is readily disassembled for maintenance. The valve disc washer 51 may be replaced without disassembling other parts of the valve. The valve washer serves the additional function of sealing the cylinder chamber.

Other features and advantages of the valve are that no control or operating element extends through the housing and hence no packing is required. The valve is fast and positive acting, through air or fluid control, and is particularly adapted for remote control. The control elements are sealed from the medium which flows through the valve, hence suffer no contamination and long life is inherent. The valve is designed and constructed for ready adaptability to many uses and is particularly suited for applications in which the accurate control of a flowing medium is required.

What is claimed is:

1. A fluid operated valve for controlling the flow of liquid comprising:
   an elongated hollow housing defining a liquid conduit; the upper end of said housing defining a valve seat; said housing including an internal transverse web permitting liquid flow therethrough;
   a piston member, including a piston and a reduced diameter stem, secured in said web;
   a valve closure member mounted on said piston member, for longitudinal rectilinear movement relative thereto, and extending out of said housing; said valve closure member including a body, having a cylinder chamber for receiving said piston and an opening from said chamber for said stem;
   a resilient washer closing the upper end of said chamber, and a cap for securing said resilient washer to said body; said washer and said cap extending radially from said body to define a flange for seating against said valve seat;
   means defining two passages in said piston member communicating, respectively, with said chamber on either side of said piston; and means defining two passages, enclosed within said housing web, respectively communicating said piston member passages with the exterior of said housing whereby fluid, from an external source, may be directed alternatively to said chamber on either side of said piston to reciprocate said valve closure member.

2. An air operated valve for the outlet opening of a container comprising:
   a cylindrical housing; the upper end of said housing defining an annular valve seat;
   a transverse web, disposed in said housing intermediate the ends thereof, and including a longitudinally extending central boss; said web and boss having a central, longitudinal bore therethrough; said web having two passages communicating said bore with the exterior of said housing; means for connecting air conduits to said housing to communicate with said passages;
   an elongated piston member comprising an upper piston, an intermediate dashpot piston of reduced diameter, and a lower stem; means securing the lower end of said stem within said web bore in sealing relationship;
   a valve closure member having a stepped bore defining an upper cylinder chamber for said piston, an intermediate reduced diameter dashpot chamber, and a lower opening for said stem; said valve closure member being supported on said piston member for relative longitudinal movement; said valve closure member including an upper cap, dimensioned to oppose said valve seat, and a resilient washer secured to said valve closure member by said cap, for sealing against said valve seat and for closing the upper end of said cylinder chamber;
   said piston member having a bore extending longitudinally from its upper end to a point adjacent its lower end; a tube disposed in said piston member bore, sealed from said bore at its upper and lower ends, and communicating with said cylinder chamber above said piston; said piston member bore communicating with said cylinder chamber below said piston;
   means communicating said piston member bore with one of said web passages; means communicating said tube with the other of said web passages; and said valve adapted to be operated remotely through conduits which direct air, selectively, to said cylinder chamber above and below said piston.

References Cited in the file of this patent

UNITED STATES PATENTS

| | | |
|---|---|---|
| 1,219,334 | Lower | Mar. 13, 1917 |
| 1,483,991 | Slattery | Feb. 19, 1924 |
| 1,824,916 | Moody | Sept. 29, 1931 |
| 2,019,786 | Jurs | Nov. 5, 1935 |
| 2,382,562 | Harvey | Aug. 14, 1945 |